(12) United States Patent
Fischer et al.

(10) Patent No.: US 11,544,032 B2
(45) Date of Patent: Jan. 3, 2023

(54) AUDIO CONNECTION AND TRANSMISSION DEVICE

(71) Applicant: Dolby Laboratories Licensing Corporation, San Francisco, CA (US)

(72) Inventors: David Matthew Fischer, San Francisco, CA (US); Benjamin George Webster, Kelowna (CA); Adam Scott Koniak, Redwood City, CA (US); Kevin Cheng Lai, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/751,165

(22) Filed: Jan. 23, 2020

(65) Prior Publication Data

US 2020/0241830 A1    Jul. 30, 2020

Related U.S. Application Data (60) Provisional application No. 62/829,397, filed on Apr. 4, 2019, provisional application No. 62/796,163, filed on Jan. 24, 2019.

(30) Foreign Application Priority Data

May 24, 2019    (EP) ..................... 19176485

(51) Int. Cl.
*G06F 3/16* (2006.01)
*H04B 10/114* (2013.01)
*G10L 19/008* (2013.01)

(52) U.S. Cl.
CPC ............ *G06F 3/162* (2013.01); *G10L 19/008* (2013.01); *H04B 10/1149* (2013.01)

(58) Field of Classification Search
CPC ... G06F 3/162; G10L 19/008; H04B 10/1149; H04B 10/25
USPC .......................................................... 398/127
See application file for complete search history.

(56) References Cited

U.S. PATENT DOCUMENTS

| | | | |
|---|---|---|---|
| 10,341,772 B2 * | 7/2019 | Fischer | ............... H04R 3/12 |
| 2002/0133818 A1 | 9/2002 | Rottger | |
| 2004/0033058 A1 * | 2/2004 | Reich | ............... H04N 5/2251 |
| | | | 348/E5.025 |
| 2004/0234088 A1 * | 11/2004 | McCarty | ............... H04R 5/04 |
| | | | 381/27 |

(Continued)

FOREIGN PATENT DOCUMENTS

| | | | | |
|---|---|---|---|---|
| EP | 3609207 B1 * | 5/2021 | ......... | G06F 12/0815 |
| KR | 20070098077 | 10/2007 | | |

(Continued)

OTHER PUBLICATIONS

Avantree et al; Quick user guide Avantree Oasis plus (TC500P); 2018; Avantree; pp. 1-2. (Year: 2018).*

(Continued)

*Primary Examiner* — Amritbir K Sandhu (57) ABSTRACT

An apparatus and method of interfacing between a source media device and a destination media device. A wireless module passes through an audio signal from the source device to an output device, and transmits a wireless signal to a wireless device that outputs the audio signal. In this manner, the number of devices used for the connections may be reduced.

20 Claims, 2 Drawing Sheets

(56) References Cited

U.S. PATENT DOCUMENTS

| | | |
|---|---|---|
| 2007/0053533 A1 | 3/2007 | Liow |
| 2007/0140499 A1* | 6/2007 | Davis ...................... G10L 19/06 |
| | | 381/23 |
| 2007/0172070 A1* | 7/2007 | Cho .......................... H04S 3/02 |
| | | 381/20 |
| 2008/0013763 A1 | 1/2008 | Lotter |
| 2009/0298431 A1 | 12/2009 | Rasmussen |
| 2010/0271560 A1* | 10/2010 | Higuchi ........... H04N 21/43615 |
| | | 348/E5.122 |
| 2010/0290643 A1* | 11/2010 | Mihelich ................. H04S 7/301 |
| | | 381/103 |
| 2011/0261966 A1* | 10/2011 | Engdegard ............ G10L 19/008 |
| | | 381/1 |
| 2012/0259612 A1* | 10/2012 | Lyons ..................... G06F 3/162 |
| | | 703/21 |
| 2013/0060363 A1* | 3/2013 | Warren ................. G06F 13/385 |
| | | 700/94 |
| 2015/0348564 A1* | 12/2015 | Paulus .................. G10L 19/008 |
| | | 704/500 |
| 2017/0243596 A1* | 8/2017 | Eggerding ............ G10L 19/008 |
| 2018/0098020 A1 | 4/2018 | Lim |
| 2018/0255398 A1 | 9/2018 | Fischer |
| 2019/0130923 A1* | 5/2019 | Elliot ............... H04N 21/43615 |
| 2020/0186575 A1* | 6/2020 | Rofe ..................... H04L 7/0041 |

FOREIGN PATENT DOCUMENTS

| | | |
|---|---|---|
| KR | 20100039535 | 4/2010 |
| WO | 2018204585 | 11/2018 |

OTHER PUBLICATIONS

ATSC et al; ATSC standard using digital audio compression; Jan. 2018; ATSC Committee; pp. 1-271. (Year: 2018).*

Avantree 2018 Bluetooth 4.2 Audio Transmitter Adapter for TV PC (Optical Digital Toslink, 3.5mm AUX, RCA, PC USB)—Audikast (TC418) http://www.avantree.com/multipoint-bluetooth-transmitter-avantree-tc418.html.

* cited by examiner

AUDIO CONNECTION AND TRANSMISSION DEVICE

CROSS REFERENCE TO RELATED APPLICATIONS

The present application claims the benefit of European Application No. 19176485.1 filed May 24, 2019, U.S. Provisional Application No. 62/829,397 filed Apr. 4, 2019, and U.S. Provisional Application No. 62/796,163 filed Jan. 24, 2019, all of which are incorporated herein by reference.

FIELD

The present disclosure relates to audio processing, and in particular, to connecting audio devices.

BACKGROUND

Unless otherwise indicated herein, the approaches described in this section are not prior art to the claims in this application and are not admitted to be prior art by inclusion in this section.

A television may generally include an audio output, such as an analog output or an optical output, for outputting an audio signal. The audio output may be connected to an external audio production device, such as one or more loudspeakers (e.g., a soundbar), an audio/video receiver, etc., to output the audio signal. Alternatively, the audio output may be connected to a wireless module (e.g., an IEEE 802.15.1 module such as a Bluetooth™ module) to transmit a wireless signal containing the audio signal to a wireless headset. Furthermore, some external audio production devices may include an integral wireless module, and some televisions may include an integral wireless module.

Providing the audio signal to a wireless headset is a growing use case, as it allows the user to experience the audio without disturbing others nearby.

SUMMARY

One issue with many existing televisions is that the number of audio outputs is limited. If the television has only one optical output and no integral wireless module, and the user has both a soundbar and a wireless module that each connect to the optical output, the user generally must unplug one device and plug in the other device. To address this issue, the user may install an optical splitter, and connect both the soundbar and the wireless module to the optical splitter; however, this increases the clutter of cables and devices around the television.

Another issue with many existing wireless modules is that they do not perform decoding of compressed audio signals (such as AC-3). When the user's soundbar is able to perform decoding, but their wireless module is not, this results in additional inconvenience for the user.

Another issue with many existing wireless modules is that they have a limited number of wireless connections, such that they may not transmit to more than one wireless device simultaneously. This can make it difficult for multiple users to watch and listen to the same device at the same time, especially if they both wish to connect wireless headsets. For example, transmitting to two wireless devices would allow a husband and wife to listen to the audio while their child sleeps in a nearby room.

Given the above issues, embodiments described herein are directed toward providing a source device with the capability to generate a wireless signal in a way that does not preclude a single audio output from being used to connect to other output devices (without physical disconnection or rearrangement of the components). For example, an embodiment connects to a television and generates a wireless signal (that is received by a wireless headset to output the audio), as well as connects to a soundbar, allowing for concurrent connection of both output devices.

According to another embodiment, an apparatus interfaces between a source media device and a destination media device. The apparatus includes an input interface, a buffer, an output interface, a processor, and a wireless transmitter. The input interface is configured to receive an input optical signal, and is configured to convert the input optical signal to a digital audio signal, wherein the digital audio signal is an electrical signal. The buffer that is configured to receive the digital audio signal converted by the input interface, and is configured to buffer the digital audio signal as a buffered digital audio signal. The output interface that is configured to receive the buffered digital audio signal from the buffer, and is configured to convert the buffered digital audio signal to an output optical signal. The processor that is configured to process the buffered digital audio signal from the buffer, and is configured to generate a processed digital audio signal based on the buffered digital audio signal. The wireless transmitter that is configured to receive the processed digital audio signal from the processor, and is configured to transmit the processed digital audio signal to at least one wireless device.

The apparatus may further include an optical receiver that includes the input interface, and an optical transmitter that includes the output interface.

The processor may be configured to perform decoding on the buffered digital audio signal in accordance with an Advanced Television Systems Committee (ATSC) A/52 standard.

The processor may be configured to perform decoding on the buffered digital audio signal according to a custom downmix that retains separation between a left surround channel and a right surround channel when upmixed by a matrix decoder.

The input optical signal may pass through the input interface, the buffer and the output interface uninterruptedly to generate the output optical signal.

The wireless transmitter may implement the IEEE 802.15.1 standard, and the wireless transmitter may be configured to transmit the processed digital audio signal simultaneously to up to two devices according to the IEEE 802.15.1 standard.

The wireless transmitter may implement a low-latency audio codec to reduce a transmission time of the processed digital audio signal.

The destination media device may be configured to output the output optical signal as an audible output.

The at least one wireless device may be configured to output the processed digital audio signal as an audible output.

The apparatus may further include an analog input that is configured to receive an input analog signal, and that is configured to provide the input analog signal to the wireless transmitter.

According to an embodiment, a method interfaces between a source media device and a destination media device. The method includes receiving, by an input interface, an input optical signal and converting, by the input interface, the input optical signal to a digital audio signal, wherein the digital audio signal is an electrical signal. The method further includes receiving, by a buffer, the digital audio signal generated by the input interface and buffering, by the buffer, the digital audio signal as a buffered digital audio signal. The method further includes receiving, by an output interface, the buffered digital audio signal from the buffer and converting, by the output interface, the buffered digital audio signal to an output optical signal. The method further includes processing, by a processor, the buffered digital audio signal from the buffer and generating, by the processor, a processed digital audio signal based on the buffered digital audio signal. The method further includes receiving, by a wireless transmitter, the processed digital audio signal from the processor and transmitting, by the wireless transmitter, the processed digital audio signal to at least one wireless device.

The method may include further details similar to those described above regarding the apparatus.

According to another embodiment, a non-transitory computer readable medium stores a computer program that, when executed by a processor, controls an apparatus to execute processing including one or more of the methods discussed above.

The following detailed description and accompanying drawings provide a further understanding of the nature and advantages of various implementations.

DETAILED DESCRIPTION

Described herein are techniques for connecting audio devices to a television. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

Figure 1:
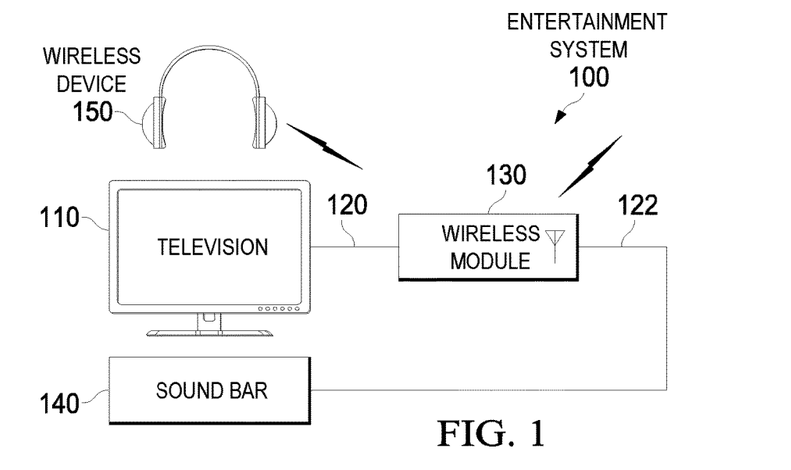
FIG. 1 is a block diagram of an entertainment system 100.

FIG. 1 is a block diagram of an entertainment system 100. The entertainment system 100 may be located in a user's home, in which case the entertainment system 100 may be referred to as a home entertainment system. The entertainment system 100 includes a television 110, two cables 120 and 122, a wireless module 130, a soundbar 140, and a wireless device 150. The entertainment system 100 may also include other devices that (for brevity) are not shown. These other devices may include a source device for providing audiovisual content to the television, such as an audio/video receiver, a digital video disc player, a cable box, a streaming stick, a computer, etc.

The television 110 receives audio and video (audiovisual) information from a source device (not shown) and displays the video information. The television 110 may output the audio information as an audio signal via the cable 120 to other devices. The television 110 may also output the audio information via integral loudspeakers. The television 110 may have additional functionality that (for brevity) is not further detailed.

The cable 120 connects the television 110 and the wireless module 130. The cable may be an analog cable, such as a 3.5 mm analog cable, that transmits an analog signal containing the audio information. The cable 120 may be an optical cable, e.g. an Electronic Industries Association of Japan (EIAJ) optical cable such as a Toshiba Link (TOSLINK) optical cable, that transmits an optical signal containing the audio information. The cable 120 may implement the International Electrotechnical Commission (IEC) 60958 type III interconnect standard (also referred to as the Audio Engineering Society (AES) AES3 interconnect standard), e.g. the Sony/Philips Digital Interconnect Format (S/PDIF). The cable 120 may be one of multiple cables connected to the television 110, such as both an analog cable and an optical cable, that connect the television 110 to the wireless module 130 or to other devices.

The wireless module 130 generally passes through the audio signal from the television 110 to the soundbar 140 via the cables 120 and 122, and transmits a wireless signal to the wireless device 150 corresponding to the audio signal from the television 110. The cable 122 between the wireless module 130 and the soundbar 140 may be an optical cable, or a type of cable similar to the cable 120 between the television 110 and the wireless module 130. The wireless module 130 may implement the IEEE 802.15.1 standard (e.g., the wireless signal may be a Bluetooth™ signal) for transmitting the wireless signal. Alternatively, the wireless module 130 need not pass through the audio signal from the television 110 to the soundbar 140. Further details of the wireless module 130 are provided below.

The soundbar 140 generates an audio output corresponding to the audio information from the television 110, as provided by the wireless module 130 via the cable 122. Alternatively, the soundbar 140 may be omitted (e.g., the television 110 may include integral loudspeakers).

The wireless device 150 generates an audio output corresponding to the audio information from the television 110, according to the wireless signal provided by the wireless module 130. The wireless device 150 may implement the IEEE 802.15.1 standard (e.g., the wireless device 150 may be a Bluetooth™ device). The wireless device 150 may have the form factor of a headset that includes a left loudspeaker and a right loudspeaker for outputting left audio and right audio, such as stereo or binaural audio, to the ears of the user. The wireless device 150 may have the form factor of a single device that includes left and right earcups, of separate devices such as left and right wireless earbuds, etc. The wireless device 150 may also be another type of wireless device such as a mobile telephone (e.g., that has paired to the wireless module using Bluetooth™ technology), a wireless loudspeaker (e.g., a Bluetooth™ speaker), etc. The wireless device 150 may be one of multiple wireless devices that may be paired with the wireless module 130. For example, the wireless module 130 may be paired with two wireless headsets that each receive a wireless signal corresponding to the audio signal from the television 110. The wireless device 150 may connect to the wireless module 130 and to other wireless devices. For example, the wireless device 150 may include a mobile telephone (that connects to the wireless module 130) and left and right wireless earbuds (that connect to the mobile telephone).

Figure 2:
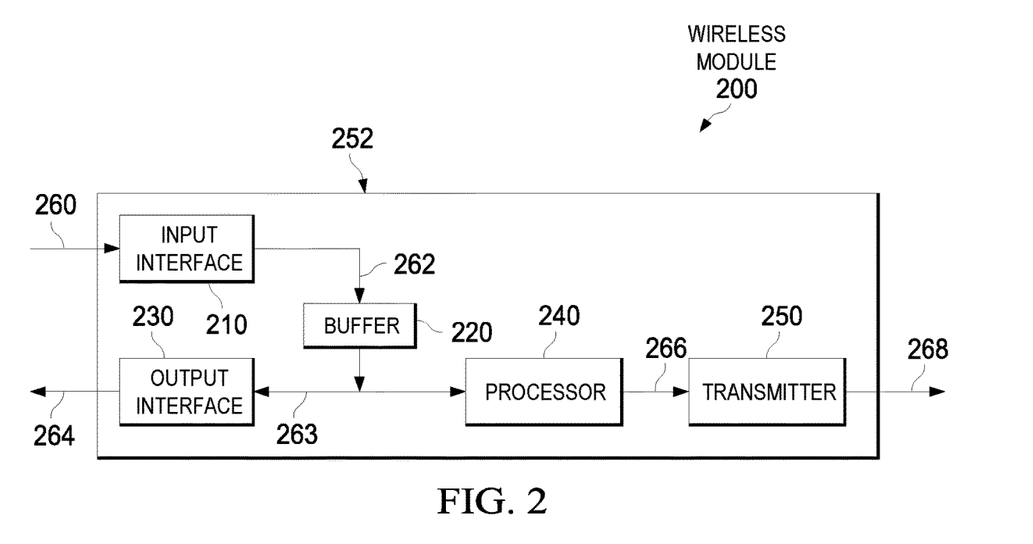
FIG. 2 is a block diagram of a wireless module 200.

FIG. 2 is a block diagram of a wireless module 200. The wireless module 200 may be used as the wireless module 130 in the entertainment system 100 (see FIG. 1). The wireless module 200 includes an input interface 210, a buffer 220, an output interface 230, a processor 240, and a wireless transmitter 250, enclosed within a housing 252. The wireless module 200 may include other components that (for brevity) are not shown.

The input interface 210 receives an input signal 260 and converts the input signal 260 into a digital audio signal 262. The input signal 260 may be provided by the cable 120 from the television 110 (see FIG. 1). The input signal 260 may be an uncompressed signal such as a stereo linear pulse code modulation (L-PCM) signal according to the IEC 60958 standard. The input signal 260 may be a compressed signal according to the Advanced Television Systems Committee (ATSC) A/52 standard such as a Dolby® Digital signal (also referred to as an AC-3 signal), which may be encapsulated according to the IEC 61937 standard (specifically, IEC 61937 sub-type 3).

The input interface 210 may be an analog input interface (e.g., a 3.5 mm analog interface), and the input signal 260 may be an analog signal. The input interface 210 may be an optical input interface (e.g., a F05 female interface for an Electronic Industries Association of Japan (EIAJ) optical cable such as a Toshiba Link (TOSLINK) optical cable), and the input signal 260 may be an input optical signal (e.g., according to the International Electrotechnical Commission (IEC) 60958 type III interconnect standard such as the Sony/Philips Digital Interconnect Format (S/PDIF)), in which case the input interface 210 converts the input signal 260 from an optical signal into the digital audio signal 262 as an electrical signal.

The input interface 210 may be a component of an input receiver, such as an optical receiver, that includes connection components (e.g., the physical interfaces), functional components (e.g., the input interface 210), etc.

The buffer 220 receives the digital audio signal 262 from the input interface 210 and performs buffering of the digital audio signal 262 to result in a buffered digital audio signal 263. For example, the digital audio signal 262 may be arranged as frames, where each frame corresponds to an audio sample in the digital audio signal 262; the buffer 220 then performs buffering of each frame. For example, when the digital audio signal 262 corresponds to an IEC 60958/61937 standard signal, the buffer 220 performs buffering of each frame (e.g., a single sample) of the IEC 60958/61937 standard signal.

The output interface 230 receives the buffered digital audio signal 263 from the buffer 220, and converts the buffered digital audio signal 263 to an output signal 264. For example, when the input signal 260 is an optical signal corresponding to an IEC 60958/61937 standard signal, the output signal 264 is an optical signal corresponding to an IEC 60958/61937 standard signal. The output signal 264 may be provided by the cable 122 to an output device such as the soundbar 140 (see FIG. 1).

The output interface 230 may be a component of an output transmitter, such as an optical transmitter, that includes connection components (e.g., the physical interfaces), functional components (e.g., the output interface 230), etc.

When the buffer 220 buffers a single frame, this allows the wireless module 200 to provide the output signal 264 to the output device (e.g., the soundbar 140 of FIG. 1) with minimal delay, enabling the wireless module 200 to operate as a pass-through for the input signal 260 (e.g., the audio signal from the television 110).

The processor 240 processes the buffered digital audio signal 263 from the buffer 220 and generates a processed digital audio signal 266 based on the buffered digital audio signal 263.

The nature of the processing performed by the processor 240 depends upon the format of the buffered digital audio signal 263. When the buffered digital audio signal 263 is uncompressed, the processing performed by the processor 240 corresponds to identifying that the frame in the buffer 220 is uncompressed, and providing that frame to the wireless transmitter 250 as the processed digital audio signal 266. When the buffered digital audio signal 263 is compressed, the processing performed by the processor 240 includes identifying that the frame in the buffer 220 is compressed, decoding the frame in the buffer 220, and providing the decoded frame to the wireless transmitter 250 as the processed digital audio signal 266. For example, when the buffered digital audio signal 263 is compressed according to the ATSC A/52 standard (e.g., a Dolby® Digital signal), the processor 240 performs decoding of the buffered digital audio signal 263 as part of generating the processed digital audio signal 266.

When decoding Dolby Digital signals, the processor 240 may employ custom downmixes to stereo which when upmixed by a downstream upmixer (or renderer or matrix decoder) may retain separation between the Left Surround and Right Surround channels of a 5.1 input signal according to the following downmix equations:

$$Lt=L+(C \times -3 \text{ dB})-(Ls \times -1.2 \text{ dB})-(Rs \times <6.2 \text{ dB})$$

$$Rt=R+(C \times -3 \text{ dB})+(Ls \times -6.2 \text{ dB})+(Rs \times -1.2 \text{ dB})$$

Or when written in scalar form:

$$Lt=L+(C \times 0.707)-(Ls \times 0.871)-(Rs \times 0.490)$$

$$Rt=R+(C \times 0.707)+(Ls \times 0.490)+(Rs \times 0.871)$$

When upmixed on a device capable of upmixing and rendering, such as when the wireless device 150 has virtualization capabilities (e.g., the wireless device 150 is a Dolby Dimension™ headset), improved listening may be experienced by the wearer.

(The buffer 220 and the processor 240 are shown as separate components for illustrative purposes. In practice, the buffer 220 and the processor 240 may be components of a digital audio decoder implemented as a system on a chip (SoC), which may also include other of the components of the wireless module 200.)

The wireless transmitter 250 receives the processed digital audio signal 266 from the processor 240 and transmits the processed digital audio signal 266 (shown as the transmitted signal 268) to at least one wireless device (e.g., the wireless device 150 of FIG. 1). For example, when the processed digital audio signal 266 corresponds to frames of the input signal 260, the wireless transmitter 250 transmits these frames.

The wireless transmitter 250 may implement the IEEE 802.15.1 standard (e.g., the wireless transmitter 250 may be a Bluetooth™ transmitter). For example, the wireless transmitter 250 may implement the aptX™ codec from Qualcomm. The wireless transmitter 250 may implement sub-band coding as part of transmitting the processed digital audio signal 266. The wireless transmitter 250 may implement a low-latency audio codec as part of transmitting the processed digital audio signal 266. In general, a low-latency audio codec increases the bandwidth of the transmission channel to enable reductions in latency. For example, the wireless transmitter 250 may implement the aptX™ Low Latency codec from Qualcomm.

The wireless transmitter 250 may pair with two wireless devices (e.g., the wireless device 150 of FIG. 1 corresponds to two wireless headsets), generating the transmitted signal 268 as a dual monocast of the processed digital audio signal 266. For example, the wireless transmitter 250 may include indicators (e.g., one or more light-emitting diodes) that show when zero, one or two connections are active, and a button that may be pressed to change the connections. When one connection is active, the user may press and hold (to pair) or press (to reconnect) a second device.

Figure 3:
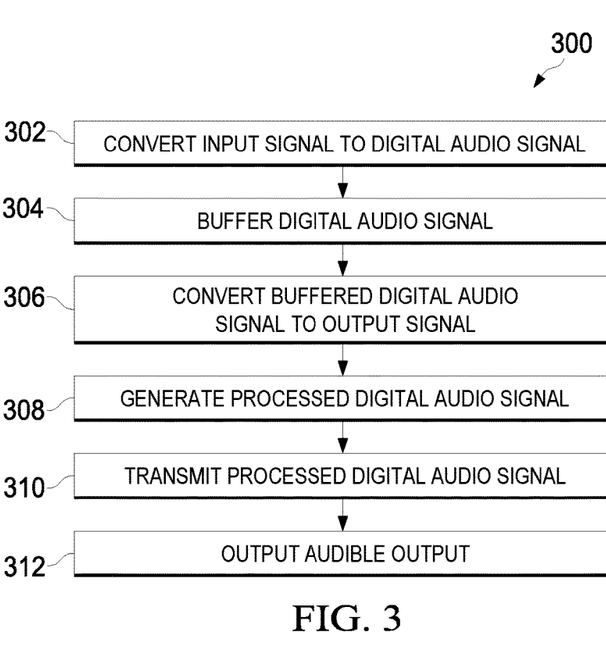
FIG. 3 is a flowchart of a method 300 of interfacing between a source media device and a destination media device.

FIG. 3 is a flowchart of a method 300 of interfacing between a source media device and a destination media device. One or more steps of the method 300 may be performed by a device such as the wireless module 200 (see FIG. 2), for example as controlled by one or more computer programs executed by the processor 240, to interface between the television 110 and the wireless device 150 (see FIG. 1).

At 302, an input signal is converted to a digital audio signal. The input signal may be an input optical signal, and the digital audio signal may be an electrical signal. For example, the input interface 210 (see FIG. 2) may receive the input signal 260 via the cable 120 (see FIG. 1) and may convert the input signal 260 into the digital audio signal 262.

At 304, the digital audio signal (converted at 302) is buffered. For example, the buffer 220 (see FIG. 2) may receive the digital audio signal 262 from the input interface 210 and may perform buffering of the digital audio signal 262 to result in the buffered digital audio signal 263.

At 306, the digital audio signal (buffered at 304) is converted to an output signal. The output signal may be an output optical signal, and the conversion may be from an electrical signal (the digital audio signal) to an optical signal (the output optical signal). For example, the output interface 230 (see FIG. 2) may receive the buffered digital audio signal 263 from the buffer 220 and may convert the buffered digital audio signal 263 to the output signal 264; the output signal 264 may be provided to the soundbar 140 (see FIG. 1) via the cable 122.

At 308, the digital audio signal (buffered at 304) is processed to generate a processed digital audio signal. When the digital audio signal is uncompressed, the processing may correspond to identifying that a frame of the buffered digital audio signal is uncompressed, and providing that frame as the processed digital audio signal. When the digital audio signal is compressed, the processing may include identifying that a frame of the buffered digital audio signal is compressed, decoding that frame, and providing the decoded frame as the processed digital audio signal. For example, the processor 240 (see FIG. 2) may process the buffered digital audio signal 263 from the buffer 220 to generate the processed digital audio signal 266.

At 310, the processed digital audio signal (see 308) is transmitted to at least one wireless device. For example, the wireless transmitter 250 (see FIG. 2) may receive the processed digital audio signal 266 from the processor 240 and may transmit the processed digital audio signal 266, as the transmitted signal 268, to the wireless device 150 (see FIG. 1).

At 312, an audible output is output by at least one of the destination media device and the wireless device. The audible output corresponds to the output signal provided to the destination media device (see 306), to the processed digital audio signal provided to the wireless device (see 310), etc. The audible output corresponds to the input signal (see 302), since the input signal corresponds to the output signal (see 306) and to the processed digital audio signal (see 308). For example, the soundbar 140 (see FIG. 1) may output an audible output corresponding to the output signal 264 (see FIG. 2) received via the cable 122. As another example, the wireless device 150 (see FIG. 1) may output an audible output corresponding to the processed digital audio signal 266 (see FIG. 2), which corresponds to the transmitted signal 268 transmitted by the wireless transmitter 250. (The user may turn off one of the output devices as desired. For example, if the user wants to use the wireless headphones, the soundbar may be turned off, and if the user wants to use the soundbar, the wireless headphones may be turned off.)

Figure 4:
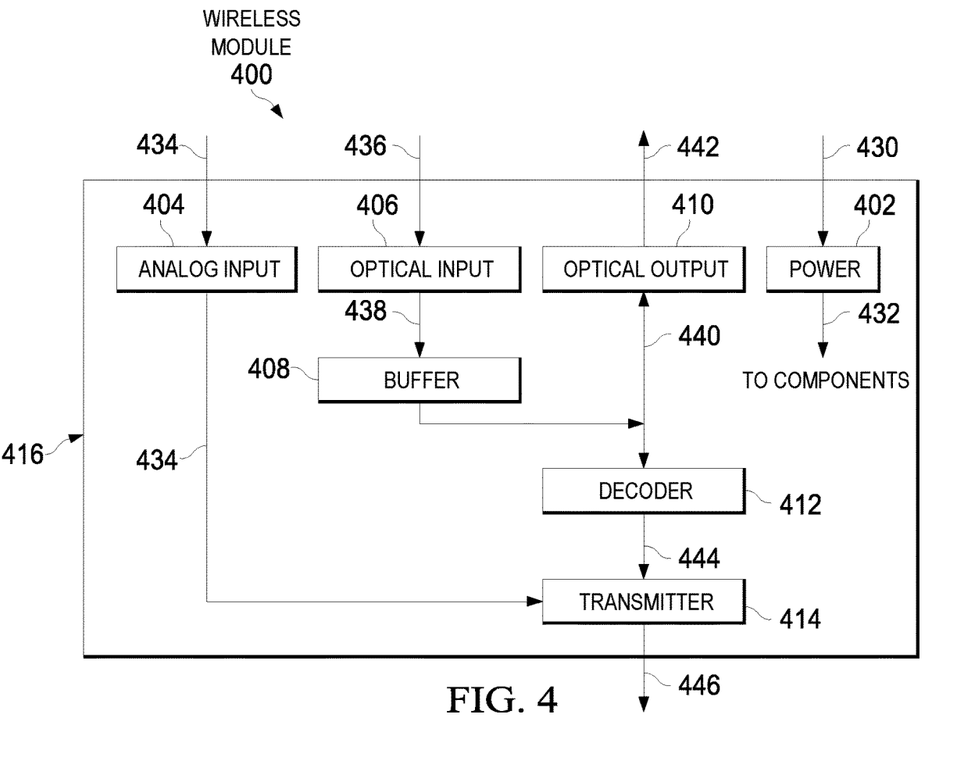
FIG. 4 is a block diagram of a wireless module 400.

FIG. 4 is a block diagram of a wireless module 400. The wireless module 400 generally corresponds to the wireless module 200 (see FIG. 2), with additional details. The wireless module 400 may perform one or more steps similar to those of the method 300 (see FIG. 3). The wireless module 400 includes a power interface 402, an analog input 404, an optical input 406, a buffer 408, an optical output 410, a decoder 412, and a wireless transmitter 414, enclosed within a housing 416. The wireless module 400 may include other components that (for brevity) are not shown.

The power interface 402 receives an input power 430 and provides power 432 to the other components of the wireless module 400. The power interface 402 may be a universal serial bus (USB) interface, such as a micro USB interface. The power interface 402 may receive the input power 430 via a USB cable connected to a USB port of the television 110 (see FIG. 1). The input power 430 may have a voltage of 5 V and a rated current of 500 mA (or 1000 mA), as needed to power the wireless module 400.

The analog input 404 receives an input analog signal 434 and provides the input analog signal 434 to the transmitter 414. The input analog signal 434 may be provided by the television 110 (see FIG. 1) or by another source device. The input analog signal 434 may be a stereo signal. The analog input 404 may be a 3.5 mm analog input rated to operate at 2.2 V peak to peak.

The optical input 406 receives an input optical signal 436 and converts the input optical signal 436 into a digital audio signal 438 (e.g., converting an optical signal into an electrical signal). The digital audio signal 438 may conform to the AES3 interconnect standard (e.g., using the S/PDIF interface). The optical input 406 may include a TOSLINK connector. Further details of the optical input 406 may be similar to those of the input interface 210 (see FIG. 2).

The buffer 408 receives the digital audio signal 438 from the optical input 406 and performs buffering of the digital audio signal 438 to result in a buffered digital audio signal 440. The buffered digital audio signal 440 may conform to the AES3 interconnect standard (e.g., using the S/PDIF interface). Further details of the buffer 408 may be similar to those of the buffer 220 (see FIG. 2).

The optical output 410 receives the buffered digital audio signal 440 from the buffer 408, and converts the buffered digital audio signal 440 to an output optical signal 442 (e.g., converting an electrical signal into an optical signal). The optical output 410 may include a TOSLINK connector. Further details of the optical output 410 may be similar to those of the output interface 230 (see FIG. 2).

The decoder 412 performs decoding, as needed, on the buffered digital audio signal 440 from the buffer 408 and generates a processed digital audio signal 444 based on the buffered digital audio signal 440. The functionality of the decoder 412 may be implemented by a processor as it executes one or more computer programs. Further details of the decoder 412 may be similar to those of the processor 240 (see FIG. 2). The decoder 412 may connect to the wireless transmitter 414 via an inter-IC sound ($I^2S$) bus.

(The buffer 408 and the decoder 412 are shown as separate components for illustrative purposes. In practice, the buffer 408 and the decoder 412 may be components of a digital audio decoder implemented as a SoC, which may also include other of the components of the wireless module 400.)

The wireless transmitter 414 receives the processed digital audio signal 444 from the decoder 412, receives the input analog signal 434 from the analog input 404, and transmits one of the processed digital audio signal 444 and the input analog signal 434 (shown as the transmitted signal 446) to at least one wireless device (e.g., the wireless device 150 of FIG. 1). In an embodiment, a valid input from the optical input 406 takes priority over an input from the analog input 404. Further details of the wireless transmitter 414 may be similar to those of the wireless transmitter 250 (see FIG. 2).

The housing 416 includes access ports for the power interface 402, the analog input 404, the optical input 406, and the optical output 410. The housing 416 may be generally cylindrical or puck-shaped, with a diameter of 5 cm and a height of 3.5 cm. This sizing enables the wireless module 400 to be placed unobtrusively near the television (e.g., behind the television).

Noteworthy Features

The devices discussed herein (e.g., the wireless module 200 of FIG. 2) may have one or more noteworthy features as compared to many existing systems. First, the wireless module includes within a single device both the function of signal pass-through (to the soundbar) and the function of signal transmission (to the wireless device). This reduces the clutter around the television, as compared to using two devices for the two functions. Second, the wireless module has the capability to decode compressed audio signals commonly available in modern digital televisions. This provides functionality beyond devices that do not perform decoding. Third, the wireless module has the capability to connect to multiple wireless devices. This provides functionality beyond devices that are limited to connecting to a single wireless device. Fourth, the wireless module has the capability to perform low-latency encoding to help ensure proper audio/video synchronization.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. An apparatus for interfacing between a source media device and a destination media device, the apparatus comprising:
   an input interface that is configured to receive an input optical signal, and is configured to convert the input optical signal to a digital audio signal, wherein the digital audio signal is an electrical signal;
   a buffer that is configured to receive the digital audio signal converted by the input interface, and is configured to buffer the digital audio signal as a buffered digital audio signal;
   an output interface that is configured to receive the buffered digital audio signal from the buffer, and is configured to convert the buffered digital audio signal to an output optical signal;
   a processor that is configured to process the buffered digital audio signal from the buffer, and is configured to generate a processed digital audio signal based on the buffered digital audio signal; and
   a wireless transmitter that is configured to receive the processed digital audio signal from the processor, and is configured to transmit the processed digital audio signal to at least one wireless device, wherein the buffer is configured to buffer the digital audio signal such that the buffered digital audio signal corresponds to a single frame of the digital audio signal, wherein the processor is configured to perform decoding on the buffered digital audio signal according to a custom downmix that retains separation between a left surround channel and a right surround channel when upmixed by a matrix decoder, wherein the input optical signal passes through the input interface, the buffer and the output interface uninterruptedly to generate the output optical signal, wherein the output interface is configured to convert the buffered digital audio signal to a single frame of the output optical signal, wherein the processor is configured to process the buffered digital audio signal to a single frame of the processed digital audio signal, and wherein the wireless transmitter is configured to transmit the single frame of the processed digital audio signal.

2. The apparatus of claim 1, further comprising:
an optical receiver that includes the input interface; and
an optical transmitter that includes the output interface.

3. The apparatus of claim 1, wherein the processor is configured to perform decoding on the buffered digital audio signal in accordance with an Advanced Television Systems Committee (ATSC) A/52:2018 standard.

4. The apparatus of claim 1, wherein the wireless transmitter implements an IEEE 802.15.1 standard, and wherein the wireless transmitter is configured to transmit the processed digital audio signal simultaneously to up to two devices according to the IEEE 802.15.1 standard.

5. The apparatus of claim 1, wherein the wireless transmitter implements a low-latency audio codec to reduce a transmission time of the processed digital audio signal.

6. The apparatus of claim 1, wherein the destination media device is configured to output the output optical signal as an audible output.

7. The apparatus of claim 1, wherein the at least one wireless device is configured to output the processed digital audio signal as an audible output.

8. The apparatus of claim 1, further comprising:
an analog input that is configured to receive an input analog signal, and that is configured to provide the input analog signal to the wireless transmitter.

9. The apparatus of claim 1, wherein the processor is configured to determine whether the buffered digital audio signal is one of uncompressed and compressed,
wherein when the buffered digital audio signal is compressed, the processor is configured to decode the buffered digital audio signal, and
wherein the buffered digital audio signal is uncompressed, the processor is configured to generate the processed digital audio signal without performing decoding.

10. The apparatus of claim 1, wherein the processor is configured to perform decoding on the buffered digital audio signal to generate a processed left signal and a processed right signal,
wherein the processed left signal is a combination of a left channel signal, a center channel signal multiplied by a first factor, a left surround channel multiplied by a second factor, and a right surround channel multiplied by a third factor, and
wherein the processed right signal is a combination of a right channel signal, the center channel signal multiplied by the first factor, the left surround channel multiplied by the third factor, and the right surround channel multiplied by the second factor.

11. The apparatus of claim 10, wherein the second factor is greater than the first factor, and wherein the first factor is greater than the third factor.

12. The apparatus of claim 10, wherein the first factor is 0.707, the second factor is 0.871, and the third factor is 0.490.

13. A method of interfacing between a source media device and a destination media device, the method comprising:
receiving, by an input interface, an input optical signal and converting, by the input interface, the input optical signal to a digital audio signal, wherein the digital audio signal is an electrical signal;
receiving, by a buffer, the digital audio signal generated by the input interface and buffering, by the buffer, the digital audio signal as a buffered digital audio signal;
receiving, by an output interface, the buffered digital audio signal from the buffer and converting, by the output interface, the buffered digital audio signal to an output optical signal;
processing, by a processor, the buffered digital audio signal from the buffer and generating, by the processor, a processed digital audio signal based on the buffered digital audio signal; and
receiving, by a wireless transmitter, the processed digital audio signal from the processor and transmitting, by the wireless transmitter, the processed digital audio signal to at least one wireless device,
wherein the buffer is configured to buffer the digital audio signal such that the buffered digital audio signal corresponds to a single frame of the digital audio signal,
wherein generating the processed digital audio signal includes performing decoding on the buffered digital audio signal according to a custom downmix that retains separation between a left surround channel and a right surround channel when upmixed by a matrix decoder,
wherein the input optical signal passes through the input interface, the buffer and the output interface uninterruptedly to generate the output optical signal,
wherein the output interface is configured to convert the buffered digital audio signal to a single frame of the output optical signal, wherein the processor is configured to process the buffered digital audio signal to a single frame of the processed digital audio signal, and wherein the wireless transmitter is configured to transmit the single frame of the processed digital audio signal.

14. The method of claim 13, wherein generating the processed digital audio signal includes performing decoding on the buffered digital audio signal in accordance with an Advanced Television Systems Committee (ATSC) A/52:2018 standard.

15. The method of claim 13, wherein the wireless transmitter implements an IEEE 802.15.1 standard, and wherein the wireless transmitter is configured to transmit the processed digital audio signal simultaneously to up to two devices according to the IEEE 802.15.1 standard.

16. The method of claim 13, wherein the wireless transmitter implements a low-latency audio codec to reduce a transmission time of the processed digital audio signal.

17. The method of claim 13, further comprising:
receiving, by an analog input, an input analog signal; and
providing, by the analog input, the input analog signal to the wireless transmitter.

18. A non-transitory computer readable medium storing a computer program that, when executed by a processor, controls an apparatus to execute processing including the method of claim 11.

19. The method of claim 13, wherein the processor is configured to perform decoding on the buffered digital audio signal to generate a processed left signal and a processed right signal,
   wherein the processed left signal is a combination of a left channel signal, a center channel signal multiplied by a first factor, a left surround channel multiplied by a second factor, and a right surround channel multiplied by a third factor, and
   wherein the processed right signal is a combination of a right channel signal, the center channel signal multiplied by the first factor, the left surround channel multiplied by the third factor, and the right surround channel multiplied by the second factor.

20. The method of claim 19, wherein the second factor is greater than the first factor, and wherein the first factor is greater than the third factor.

\* \* \* \* \*